United States Patent [19]
Szantay et al.

[11] 3,888,865
[45] June 10, 1975

[54] PROCESS FOR THE PREPARATION OF EBURNAMONINES

[75] Inventors: Csaba Szantay; Lajos Szabo; Janos Kreidl; Gyorgy Kalaus; Tibor Keve; Peter Turczanyi; Istvan Polgar; Maria Farkas nee Kirjak; Katalin Lakszner, all of Budapest, Hungary

[73] Assignee: Richter Gedeon Vgyeszeti Gyzr Rt., Budapest, Hungary

[22] Filed: Sept. 14, 1973

[21] Appl. No.: 397,217

[52] U.S. Cl. .................................. 260/288; 260/687
[51] Int. Cl. .............................................. C07d 33/50
[58] Field of Search ................................ 260/288 R

[56] References Cited
FOREIGN PATENTS OR APPLICATIONS
151,295    1965    Hungary ....................... 260/288 CF

OTHER PUBLICATIONS

Mokery et al., Tet. Let., No. 10; 1962; p. 433–37.

Trojeunek et al.; Tet. Let., No. 20; 1961; p. 702–6.

*Primary Examiner*—Donald G. Daus
*Assistant Examiner*—Mary C. Vaughn

[57] ABSTRACT

Racemic or optically active eburnamonine is obtained by the oxidation of vincaminic acid; in an organic solvent or solvent mixture; the oxidation is carried out with an oxidizing agent having low solubility in the said solvent medium, e.g. with silver oxide or manganese dicarbonate.

5 Claims, No Drawings

PROCESS FOR THE PREPARATION OF EBURNAMONINES

This invention relates to an improved process for the preparation of eburnamonine in reacemic or optically active (dextrorotatory or levorotatory) forms.

The dextrorotatory eburnamonine, an alkaloid of Hunteria eburnea, and its derivatives, as well as the levorotatory eburnamonine (vincamone) and its derivatives (such as vincanol) are compounds of valuable physiological properties [Chimica Therapeutica 6, 221 (1971)].

According to a known method for the synthesis of levorotatory eburnamonine (vincamone), the 14-carbomethoxy group of vincamin is reacted with hydrazine, the obtained hydrazide is contacted with nitrous acid, and the formed azide is subjected to Curtius decomposition to yield the aimed product (Hungarian Pat. No. 151,295). Although this method for the elimination of the carboxy group provides with a relatively good yield the aimed 14-oxo compound, significant difficulties arise from the fact, that the synthesis is a multi-step one, and vincamone is prepared by the complicated azide-forming reaction, requiring high operational skill.

It is also known that vincaminic acid, obtained by the hydrolysis of vincamine, can be oxidized with chromium trioxide in pyridine medium to give vincamone with a yield of 10.8%. Vincamone can also be prepared by the reductive splitting of vincamin using lithium aluminium hydride; this process runs with a yield of 10.2% [Trojanek: Coll. Czech. Chem. Comm. 29, 433 (1964)]. The common disadvantage of these processes is the very low yield.

Racemic eburnamonine can also be synthetized as described by E. Wenckert [J. Am. Chem. Soc. 87, 1580 (1965)]. According to this process 1-ethyl-1,2,3,4,6,7-hexahydro-indolo/2,3-a/quinolizinium perchlorate is coupled with iodoacetic acid, the obtained product is reduced, and finally treated with an alkali to yield racemic eburnamonine. The disadvantage of this process is, however, that it provides a racemic mixture with a low yield in a complicated synthesis.

The synthesis of dextrorotatory eburnamonine has not been described in the literature so far.

This invention provides a simple and economic commercial process for the preparation of eburnamonine, free of the disadvantages of the known syntheses, producing eburnamonine with higher yields and optionally in the form of the pure optical isomers.

We have found that when an organic solution of racemic or optically active (dextrorotatory or levorotatory) vincaminic acid, prepared optionally by the hydrolysis of racemic or optically active (dextrorotatory or levorotatory) vincamine, is reacted at elevated temperatures with an oxidizing agent having low solubility in said organic solvent, racemic or optically active (dextrorotatory or levorotatory) eburnamonine is formed with a high yield.

This invention relates to a process for the preparation of racemic or optically active (dextrorotatory or levorotatory eburnamonine through the oxidation of vincaminic acid, prepared optionally by the hydrolysis of vincamine, in which vincaminic acid is oxidized in an organic solvent or solvent mixture with an oxidizing agent having low solubility in said solvent medium.

According to the process of the invention racemic or optically active (dextrorotatory or levorotatory) vincaminic acid is dissolved in an organic solvent and reacted at elevated temperatures with an oxidizing agent having low solubility in said solvent medium, such as silver carbonate, silver oxide, manganese oxide, etc. The reaction can be carried out at a temperature of 80° to 200°C, preferably at 110° to 160°C. Depending on the temperature, the reaction terminates within a period of 10 minutes to 20 hours, preferably within 1 to 3 hours.

When the oxidation is over, the oxidizing agent is removed, and the product is isolated from the reaction mixture by partial or total evaporation. The isolated product is recrystallized, if necessary.

According to a preferred method of the invention an aliphatic or aromatic hydrocarbon, preferably xylene is used as a solvent, and silver carbonate, preferably deposited onto a support, such as a silver carbonate/Celite system is used as oxidizing agent. The reaction is carried out preferably at the boiling point of the solvent.

According to a variant of the new process dextrorotatory vincamine, a compound occurring also in the nature, is used as starting substance. This compound is converted into levorotatory vincaminic acid by known procedures, and this latter substance is reacted as described above to yield levorotatory eburnamonine (vincamone).

Racemic vincamine, formed in the vincamine synthesis, can also be used as starting substance. This compound is hydrolyzed to yield racemic vincaminic acid, which latter, in turn, is converted into racemic eburnamonine.

According to a further process variant of the process, also levorotatory vincamine, obtained by the resolution of racemic vincamine, can be used as starting substance. This compound is subjected to hydrolysis, and the obtained dextrorotatory vincaminic acid is oxidized into dextrorotatory eburnamonine, a compound occurring also in the nature.

The main advantages of the process of the invention are as follows:

racemic and optically active (dextrorotatory or levorotatory) eburnamonines can be synthetized by an easy and economic commercial process with good yields;

the optically active (dextrorotatory or levorotatory) eburnamonine is obtained in high purity grade, free of impurities and stereoisomeric substances;

the crystallization of the crude products yields chromatographically uniform substances of sharp melting points.

The invention is further elucidated by the following non-limiting Examples.

EXAMPLE 1

Racemic eburnamonine a. 2.0 g. of racemic vincamine are dissolved in 10 ml. of 95% ethanol, and the solution is boiled for 1 hour in the presence of 0.5 g. of sodium hydroxide. The homogeneous solution is evaporated to dryness in vacuo, and the residue is dissolved in 20 ml. of water. The pH value of this solution is adjusted to 7 with dilute acetic acid. The separated racemic vincaminic acid is filtered off and washed successively with water and acetone. Yield: 1.8 g. (94%), m.p.: 252°C.

b. 1.0 g. of racemic vincaminic acid is dissolved in 40 ml. of dry xylene, 0.5 g. of silver carbonate deposited onto 0.5 g. of Celite are added to the solution, and the mixture is boiled for 1.5 hours under nitrogen, with constant stirring. The reaction mixture is filtered, and the filtrate is washed with 5% aqueous sodium carbonate solution. The organic phase is separated, dried and evaporated in vacuo. The oily residue is triturated with 4 ml. of methanol. The separated crystals are collected and washed with methanol. 0.63 g. (73%) of racemic eburnamonine are obtained; m.p.: 201°–202°C.

EXAMPLE 2

Dextrorotatory eburnamonine a. 8.0 g. of levorotatory vincamine (m.p.: 215°–216°C) are dissolved in 40 ml. of 95% ethanol, and the solution is boiled for 1 hour in the presence of 1.76 g. of sodium hydroxide. Thereafter one proceeds are described in Example 1a. 7.05 g. (92%) of dextrorotatory vincaminic acid are obtained; m.p.: 255°–258°C.

b. A suspension of 7.00 g. of dextrorotatory vincaminic acid and 7.0 g. of silver carbonate deposited onto 7.0 g. of Celite in 280 ml. of dry xylene is boiled for two hours. The mixture is filtered, the filtrate is washed three times with 30 ml. portions of 5% aqueous sodium carbonate solution, dried over anhydrous magnesium sulfate, and evaporated in vacuo. The obtained 5.6 g. of residue are triturated with 20 ml. of methanol. 5.1 g. (85%) of dextrorotatory eburnamonine are obtained; m.p.: 174°C.

EXAMPLE 3

Levorotatory eburnamonine a. 1.0 g. of dextrorotatory vincamine is dissolved in 5 ml. of 95% ethanol, and the solution is boiled in the presence of 0.22 g. of sodium hydroxide. Thereafter one proceeds as described in Example 1a. 0.91 g. (94%) of levorotatory vincaminic acid are obtained; m.p.: 256°–258°C.

b. Levorotatory vincaminic acid is reacted as described in Example 2b to obtain levorotatory eburnamonine with a yield of 77%. M.p.: 174°C.

EXAMPLE 4

Racemic eburnamonine 1.0 g. of racemic vincaminic acid (prepared as described in Example 1, paragraph a) is dissolved in 200 ml. of dry xylene, 2.5 g. of manganese dioxide deposited onto 2.5 g. of Celite are added to the solution, and the mixture is boiled for 1.5 hours under nitrogen, with constant stirring. The reaction mixture is filtered, and the filtrate is shaken out twice with 1.5% aqueous sulphuric acid solution (25 ml. each). The organic phase is discarded, the unified aqueous phases are adjusted to pH = 9 with aqueous ammonia solution. The obtained precipitate is collected by filtration, washed with water and dried. 0.80 g. (92.2%) of racemic eburnamonine are obtained; m.p. 201°–202°C.

EXAMPLE 5

Dextrorotatory eburnamonine 1.0 g. of dextrorotatory vincaminic acid (prepared as described in Example 2, paragraph a) is dissolved in 200 ml. of dry xylene, and the solution is treated in the same way as described in Example 4. Dextrorotatory eburnamonine is obtained with 91.5% yield; m.p.: 173°–174°C.

EXAMPLE 6

Levorotatory eburnamonine 1.0 g. of levorotatory vincaminic acid (prepared as described in Example 3, paragraph a) is dissolved in 200 ml. of dry xylene, and the solution is treated in the same way as described in Example 4. Levorotatory eburnamonine is obtained with 93.5% yield; m.p.: 173°–174°C.

What we claim is:

1. A process for the preparation of racemic or optically active (dextrorotatory or levorotatory) eburnamonine by the oxidation of vincaminic acid, which comprises the step of reacting vincaminic acid in an organic solvent selected from aliphatic and aromatic hydrocarbons and mixtures thereof, with an oxidizing agent having low solubility in said solvent medium and selected from silver carbonate, silver oxide and manganese dioxide.

2. A process as claimed in claim 1, in which the organic solvent is xylene.

3. A process as claimed in claim 1, in which oxidation is carried out at a temperature of 80° to 200°C, for a period of 10 minutes to 20 hours.

4. A process as claimed in claim 1, in which the vincaminic acid is selected from racemic or optically active vincaminic acid.

5. A process as claimed in claim 3, in which the oxidation is carried out at a temperature of 110° to 160°C for a period of 1 to 3 hours.

* * * * *